Oct. 5, 1937.  W. E. PHILIPS  2,094,747
BELT CONVEYER
Filed March 13, 1936
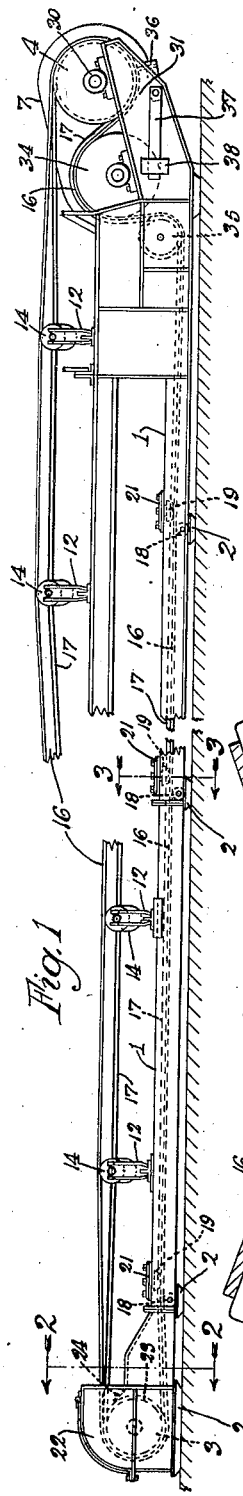
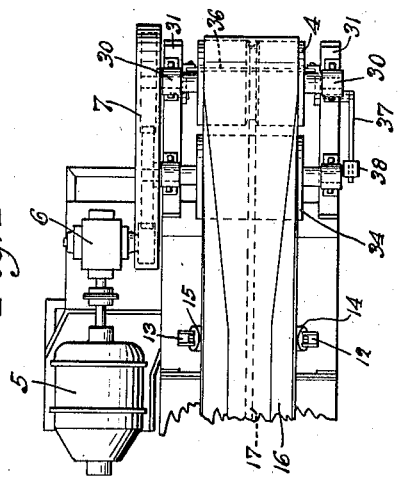
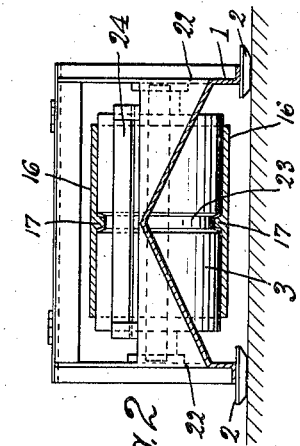
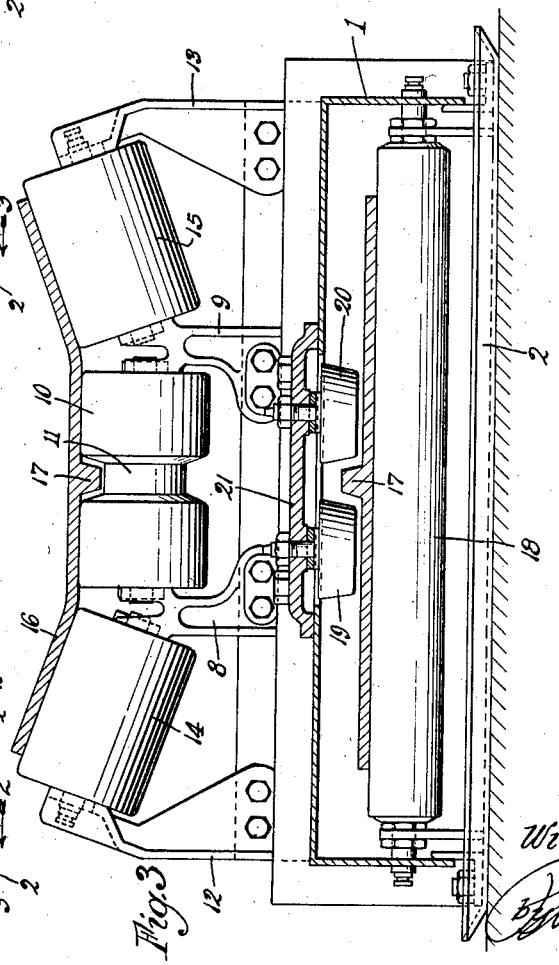
Inventor
William E. Philips
Attorneys.

Patented Oct. 5, 1937

2,094,747

UNITED STATES PATENT OFFICE 2,094,747

BELT CONVEYER

William E. Philips, Oak Park, Ill., assignor to Link-Belt Company, Chicago, Ill., a corporation of Delaware Application March 13, 1936, Serial No. 68,655

10 Claims. (Cl. 198—192)

My invention relates to improvements in belt conveyers and supporting means therefor and has for one object to provide a new and improved means whereby the belt conveyer is supported and aligned on the troughing and other rolls.

Another object is to provide a belt conveyer which will have a maximum life and will require a minimum amount of power to operate it.

Other objects will appear from time to time throughout the specification and claims.

My invention is illustrated more or less diagrammatically in the accompanying drawing, wherein—

Figure 1 is a side elevation of a belt conveyer embodying my invention;

Figure 2 is a section along the line 2—2 of Figure 1;

Figure 3 is a section on an enlarged scale along the line 3—3 of Figure 1;

Figure 4 is a fragmentary plan view.

Like parts are indicated by like characters throughout the specification and drawing.

1 is a longitudinally extended box-like conveyer frame. In this case, it is provided with supported shoes 2, which rest upon the ground. There may be a plurality of these frames arranged end to end depending upon the length of the conveyer desired. 3 is a tail pulley mounted at one end of the frame. 4 is a head pulley mounted at the other end of the frame. 5 is a motor, 6 a speed reducer, 7 a transmission gear by which the head pulley 4 is driven. Intermediate the head and tail pulleys are a series of belt conveyer supporting brackets all similar. Hence a description of one will suffice for all. The brackets for the working run of the belt comprise two arms 8, 9, extending upwardly from the frame 1. These arms support a rotatable horizontally disposed idler shaft 10, which shaft has a peripheral groove 11 therein. This groove is preferably intermediate the two ends of the pulley though it might be elsewhere positioned. Adjacent the brackets 8, 9, are brackets 12, 13, which also project upwardly from the frame 1 and upwardly and outwardly inclined troughing rolls 14, 15, are supported one between the brackets 8, 12 and the other between the brackets 9, 13. These brackets as shown are cylindrical though they might also if desired be grooved as is the roll 10.

The conveyer belt 16 where it rests upon the rolls 10, 14, and 15 is upwardly troughed as indicated and these rolls are spaced close enough so that between the rolls, the belt retains its troughed position. Integral with the underside of the belt 16 is a flexible rib 17 which engages the hooks 11, the purpose of this rib being to center the belt on the troughing idler rolls and since this centering effect is preferably obtained at a point intermediate the two edges of the belt, as the belt tends to swing or displace in one direction or the other, one half of the belt is centered by the rib acting on it in tension and the other half on thrust so that the tendency to bend the belt is reduced to a minimum and because this centering rib is on the underside of the belt, entirely outside of the influence, entirely carried by the belt, it is effectually protected and because it is at the center of the belt, it gives the belt increased reinforcing strength at the center where it is most needed.

The return non-working run of the belt is supported on cylindrical idler rolls 18, which are mounted in the box frame 1 below that part of the frame which supports the previously mentioned idler roll brackets. The belt as it travels along this roll is generally flat and the rib 17, instead of being below the belt is above it. Guide pulleys 19, 20 extend downwardly from a bracket 21 on the frame 1. These pulleys have a truncated conical contour so that they may engage the guide rib 17 generally in the same way as the guide rib is engaged by the groove 11 so that they also tend to maintain the belt in proper position on the idler roll.

The head pulley 4 is mounted on bearings 30, on the frame extension 31. It is associated with an auxiliary drive pulley 34, the belt winding around the head pulley 4, the auxiliary pulley 34 and the idler 35. The driving train drives both pulleys 4 and 34. 36 is a scraper mounted on the lever arm 37 held by the counterweight 38 against the outer periphery of the belt as it passes over the pulley 4. The scraper is straight, the belt being at that point smooth and flat because the integral rib penetrates the groove in the pulley and enables the belt to present a flat surface to the scraper. 24 is a scraper mounted on the frame 22 engaging the outer periphery of the tail pulley 3, which pulley is grooved at 23 as are the pulleys 4 and 35. The auxiliary drive pulley 34 engaging the face of the belt makes it unnecessary to have any groove in the auxiliary drive pulley.

I claim:

1. In combination, a flexible conveyer belt, an integral flexible guide rib projecting from one face thereof, head and tail pulleys around which the belt travels, and an idler roll associated with one run of the belt, all having annular grooves adapted to be penetrated by the guide rib, a troughing roll having its axis upwardly and outwardly inclined with respect to the axis of the grooved roll, engaging and troughing the outer edge of the belt, an idler roll engaging the other run of the belt on the face opposed to the rib and means spaced from the roll to permit passage of the belt therealong adapted to engage the rib to guide the belt.

2. In combination, a flexible conveyer belt, an integral flexible guide rib projecting from one face thereof, head and tail pulleys around which the belt travels having annular grooves to be penetrated by the guide rib, an idler roll engaging one run of the belt on the face opposed to the rib and means spaced from the roll to permit passage of the belt therealong, adapted to engage the rib to guide the belt.

3. In combination, a flexible conveyer belt, an integral flexible guide rib projecting from one face thereof, head and tail pulleys around which the belt travels, and an idler roll associated with one run of the belt, all having annular grooves adapted to be penetrated by the guide rib, a troughing roll having its axis upwardly and outwardly inclined with respect to the axis of the grooved roll, engaging and troughing the outer edge of the belt, an idler roll engaging the other run of the belt on the face opposed to the rib and means spaced from the roll to permit passage of the belt therealong adapted to engage the rib to guide the belt, said guide means comprising rolls one on each side of the rib mounted on axes intersecting the belt.

4. In combination, a flexible conveyer belt, an integral flexible guide rib projecting from one face thereof, head and tail pulleys around which the belt travels having annular grooves to be penetrated by the guide rib, an idler roll engaging one run of the belt on the face opposed to the rib and means spaced from the roll to permit passage of the belt therealong, adapted to engage the rib to guide the belt, said guide means comprising rolls one on each side of the rib mounted on axes intersecting the belt.

5. In combination, a flexible conveyer belt, an integral flexible guide rib projecting from one face thereof, head and tail pulleys around which the belt travels, and an idler roll associated with one run of the belt, all having annular grooves adapted to be penetrated by the guide rib, a troughing roll having its axis upwardly and outwardly inclined with respect to the axis of the grooved roll, engaging and troughing the outer edge of the belt, an idler roll engaging the other run of the belt on the face opposed to the rib and means spaced from the roll to permit passage of the belt therealong adapted to engage the rib to guide the belt, said guide means comprising a pair of opposed rollers supported on one side only above the belt, the faces of the rollers being truncated cones, their ends out of contact with the belt, their faces being adapted to engage the rib.

6. In combination, a flexible conveyer belt, an integral flexible guide rib projecting from one face thereof, head and tail pulleys around which the belt travels having annular grooves to be penetrated by the guide rib, an idler roll engaging one run of the belt on the face opposed to the rib and means spaced from the roll to permit passage of the belt therealong, adapted to engage the rib to guide the belt, said guide means comprising a pair of opposed rollers supported on one side only above the belt, the faces of the rollers being truncated cones, their ends out of contact with the belt, their faces being adapted to engage the rib.

7. In combination, a flexible conveyer belt, having a flexible guide rib projecting from its underside, a plurality of relatively short cylindrical rolls associated with the conveying run of and engaging the underside of the belt, one of said rolls being grooved intermediate its ends to engage and guide the rib, another being upwardly and outwardly inclined to trough the belt, a relatively long cylindrical roll adapted to support the working side of the belt on the return run thereof, means thereabove, out of contact with the surface of the belt, adapted to engage the rib to guide it.

8. In combination, a flexible conveyer belt having a flexible guide rib projecting from its underside, a plurality of relatively short cylindrical rolls associated with the conveying run of and engaging the underside of the belt, one of said rolls being grooved intermediate its ends to engage and guide the rib, another being upwardly and outwardly inclined to trough the belt, a relatively long cylindrical roll adapted to support the working side of the belt on the return run thereof, a plurality of short rolls thereabove, out of contact with the surface of the belt, adapted to engage the rib to guide it.

9. In combination, a flexible conveyer belt, having a flexible guide rib projecting from its underside, a plurality of relatively short cylindrical rolls associated with the conveying run of and engaging the underside of the belt, one of said rolls being grooved intermediate its ends to engage and guide the rib, another being upwardly and outwardly inclined to trough the belt, a relatively long cylindrical roll adapted to support the working side of the belt on the return run thereof, means thereabove, out of contact with the surface of the belt, adapted to engage the rib to guide it, a support upon which all said rolls are mounted intermediate the ends of the belt.

10. In combination, a flexible conveyer belt, having a flexible guide rib projecting from its underside, a plurality of relatively short cylindrical rolls associated with the conveying run of and engaging the underside of the belt, one of said rolls being grooved intermediate its ends to engage and guide the rib, another being upwardly and outwardly inclined to trough the belt, a relatively long cylindrical roll adapted to support the working side of the belt on the return run thereof, means thereabove, out of contact with the surface of the belt, adapted to engage the rib to guide it, the axes of the rolls being located generally in a vertical plane intersecting the line of travel of the belt.

WILLIAM E. PHILIPS.